United States Patent
Carlino et al.

(10) Patent No.: US 8,108,712 B1
(45) Date of Patent: Jan. 31, 2012

(54) METHOD AND APPARATUS FOR REMOVING A COMPUTER FROM A COMPUTER CLUSTER OBSERVING FAILURE

(75) Inventors: Charles J. Carlino, Santa Clara, CA (US); Hoa Nguyen, San Jose, CA (US); Jayesh Patel, Santa Clara, CA (US); Eric Soderberg, Mountain View, CA (US); Daniel W. Hepner, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 108 days.

(21) Appl. No.: 12/588,857

(22) Filed: Oct. 30, 2009

(51) Int. Cl.
*G06F 11/00* (2006.01)
(52) U.S. Cl. ......................................................... 714/4.1
(58) Field of Classification Search ............. 714/4.1–4.2
See application file for complete search history.

(56) References Cited

U.S. PATENT DOCUMENTS

| | | | | |
|---|---|---|---|---|
| 5,991,518 A * | 11/1999 | Jardine et al. | ................... | 714/4.5 |
| 6,002,851 A * | 12/1999 | Basavaiah et al. | ............. | 714/4.5 |
| 6,449,641 B1 * | 9/2002 | Moiin et al. | ................... | 709/220 |
| 2003/0233594 A1 * | 12/2003 | Earl | ................................. | 714/4 |
| 2004/0010586 A1 * | 1/2004 | Burton et al. | ................. | 709/224 |
| 2004/0153866 A1 * | 8/2004 | Guimbellot et al. | ............. | 714/47 |
| 2009/0043887 A1 * | 2/2009 | Coekaerts | ..................... | 709/224 |
| 2009/0113051 A1 * | 4/2009 | Franklin | ....................... | 709/225 |

* cited by examiner

*Primary Examiner* — Robert Beausoliel, Jr.
*Assistant Examiner* — Neil Miles

(57) ABSTRACT

A method, and a corresponding apparatus, implemented on a suitably programmed processor, selects an ideal computer to remove from a computer cluster observing a failure condition. The computer cluster includes multiple computers. The method includes the steps of recording, at each of the computers, health data for each of the computers, computing, at a health timeout, a first health score for each of the computers based on the health data, computing, at a fatal timeout, and based on the first health score, a second health score for each of the computers, and at each of the computers, selecting a computer having the highest health score for removal from the cluster.

20 Claims, 3 Drawing Sheets

METHOD AND APPARATUS FOR REMOVING A COMPUTER FROM A COMPUTER CLUSTER OBSERVING FAILURE

BACKGROUND

Computer systems employing multiple individual computers, processors, or nodes may employ some type of quorum programming, wherein a majority of the individual computers determines membership in the computer system. Thus, a majority of computers may determine to admit or remove an individual computer from membership in the computer system. In this scheme, a computer that is removed is deactivated; a computer that is admitted is activated. The individual computers may determine membership on a periodic basis, and that basis may be based on regular intervals (e.g., every minute) or on episodic events (e.g., computer system powered up).

Computer systems comprising multiple individual computers also are known to employ various protocols and communications techniques so that an individual computer can track the health of the other computers in its computer system. These protocols typically involve sending periodic health messages (e.g., heartbeats) to the other computers in the computer system, or to a central computer. However, these protocols may only work well in the presence of a total and abrupt failure of a computer within the computer system. These protocols are not able to detect and compensate for other types of failures that likely occur in the computer system. Moreover, these protocols cannot guarantee that the correct (ideal) computer will be deactivated.

DETAILED DESCRIPTION

Figure 1:
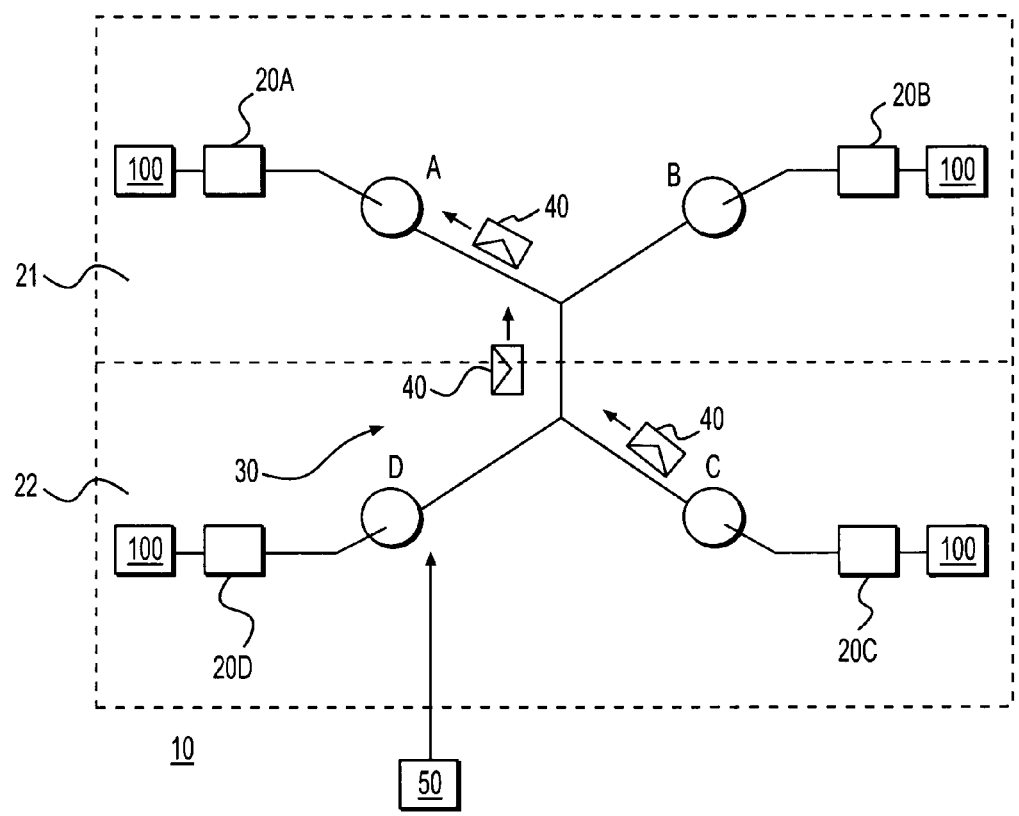
FIG. 1 illustrates an exemplary highly available computer cluster which may observe a failure and then select an ideal computer to remove in response to the observed failure.

FIG. 1 illustrates an exemplary highly available computer cluster 10 which may observe a failure and in response, select an ideal computer to remove from the cluster 10. The computer cluster 10 includes multiple computers 20A-20D connected at respective nodes A-D in a star topology 30 that includes a communications fabric allowing each of the computers 20 to communicate with each of the other computers 20 of the star topology. The communications may be by way of messages. For example, a message 40 may be sent from node C to node A. Node C may send similar messages to node B and node D. An exemplary protocol 100, an instantiation of which is implemented on each computer 20, controls membership in the cluster 10. The protocol 100 may include a health protocol 200 (see FIG. 2) that is used in ascertaining the health of the computers 20. The health protocol will be described in more detail with respect to FIG. 2. Although FIG. 1 shows a star topology 30, other topologies will support the features disclosed herein. In addition, although FIG. 1 shows four computers 20A-20D, any number of computers 20 can connect to the topology 30, and only a subset of the computers 20 may be active at any time. Finally, the computers 20 in the cluster 10 may be grouped into subsets, or sub-clusters 21 and 22 of the cluster 10.

In FIG. 1, the computers 20 may communicate with every other computer 20 on a periodic basis, even though, at a lower level, the computers 20 are not fully connected. The cluster 10 has a known set of potentially active computers 20. After the cluster 10 has been started, a subset of the full membership of the cluster is known to be active at any time. For example, only the computers 20A-20C may be active.

Protocol 100 is activated in the computer cluster 10 whereby the individual computers 20 can keep track of the active computers 20 in the cluster 10. One exemplary implementation of the protocol 100 involves: 1) each active computer 20 sending health data in the messages, e.g., the message 40, to each of the other active computers 20 on a periodic basis, and 2) each active computer 20 tracking receipt of such messages from each of the active computers 20. The protocol 100 also may include rules for joining the cluster 10 as an active computer 20 and rules for leaving the cluster 10.

Figure 2:
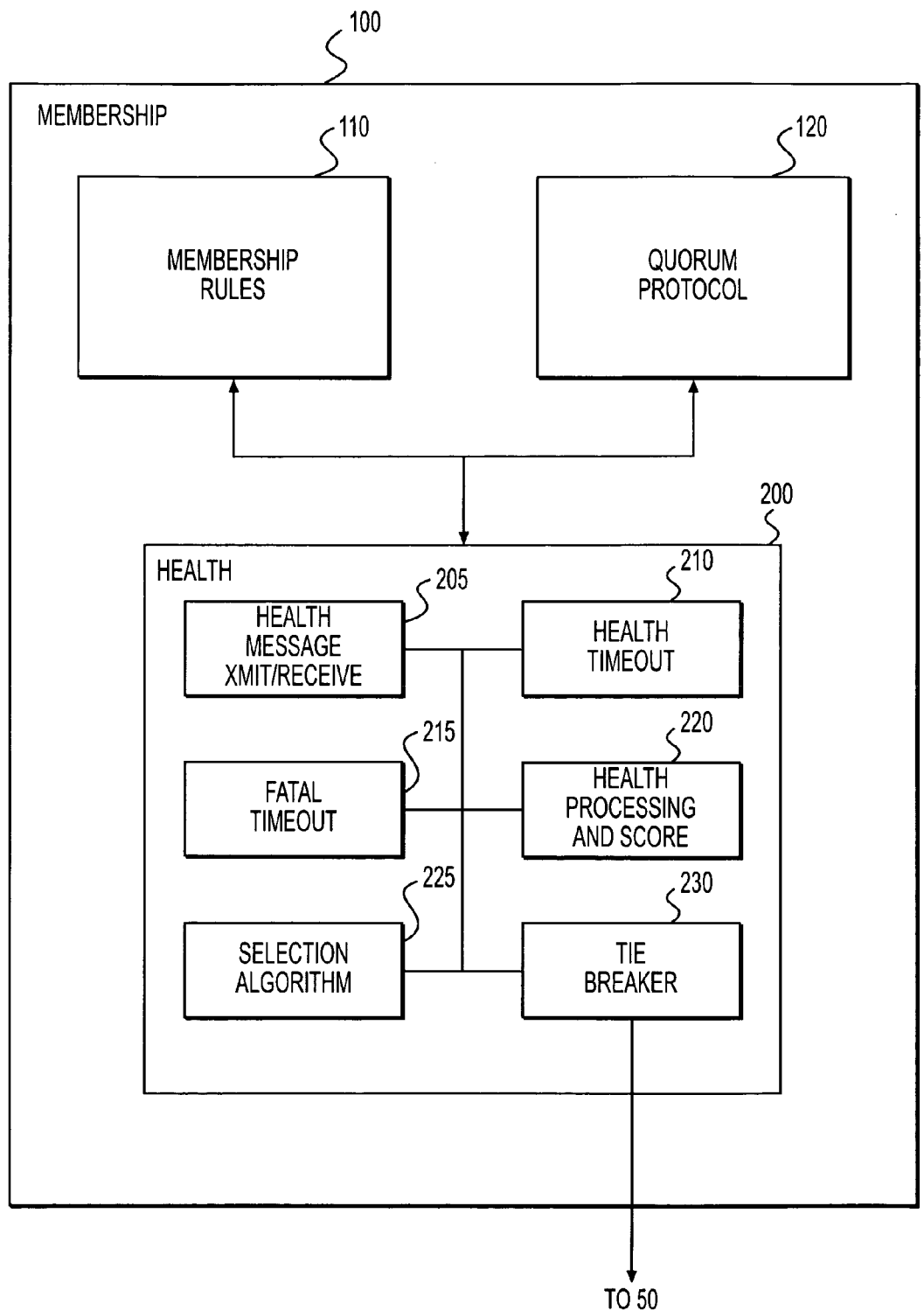
FIG. 2 is a block diagram of an exemplary membership protocol used with the computer cluster of FIG. 1 to control cluster membership.

FIG. 2 is a block diagram of exemplary membership protocol 100. The protocol 100 includes a membership rules module 110 that contains cluster membership rules, and applies those rules to add, retain, or remove computers from the cluster. Quorum module 120 provides additional rules and processing functions to allow a majority of computers to determine membership in the cluster. Finally, the membership protocol 100 includes exemplary health protocol 200, used with the computer cluster 10 to control cluster membership considering the health of the computers in the cluster.

The health protocol 200 includes a health message transmit and receive module 205 that formats and sends health data in outgoing messages, and receives and interprets health data in incoming messages. The module 205 also controls the timing of such messages. Health timeout module 210 and fatal time out module 215 provide corresponding timeouts that direct other components of the health module 200 to calculate and report health scores, and determine which, if any, computer should be removed from the cluster. The health score processing is completed, and health scores stored, by health processing and scoring module 220, and the selection of the ideal computer is performed by selection module 225. Finally, as will be explained later, tie breaker module 230 operates to resolve ties among ideal computers; in one embodiment, the tie breaker rules are maintained with the module 230; in other embodiments, the module 230 communicates data to an outside or third party processor, which invokes a separate tie breaking algorithm.

Each element or module of the health protocol 200 may be implemented by an active computer 20 with respect to each other active computer 20. At a time when an active computer 20 fails to communicate (i.e., send a message) within a specified timeout period, the active computer 20 failing to communicate is designated for removal, and then is removed from the cluster 10, and the remaining active computers 20 see the removed computer 20 as now in an inactive state. The protocol 200 works well to detect failures that involve a computer 20 failing abruptly and totally. The protocol 200 also works well with other types of failures that are not so sudden and catastrophic, such as when computer 20 experiences a failure such that the computer 20 can send periodic health messages to other computers 20 in the cluster 10 but cannot receive health messages from those same computers 20. Such a communications failure may result from a software fault, a hardware fault, misconfiguration of routers in the communications fabric of the ring topology 30, or misconfiguration of software local to a specific computer 20, which blocks selected communications as part of a system for making the computer 20 more secure.

When a specific computer 20 experiences a less catastrophic failure, as noted above, or if there are indications that a failure is imminent, ideally, the specific computer 20, and not some other computer, would be designated for removal, or removed (inactivated). Assume for example, that computers 20A-20C are active on the cluster 10 and that computer 20C no is longer able to receive messages from the other computers 20A and 20B in the cluster 10. The computer, 20C, which no longer receives messages, "observes," through its version of the protocol 200, that the other computers 20A and 20B in the cluster 10 have failed. A simplistic protocol that removes a computer 20 that has not been heard from lately would identify one of the other computers 20A, 20B as a candidate for removal, when in fact, it is the computer 20C, if any, that should be removed from the cluster 10. Instead of a simplistic protocol, the protocol 200 will identify the correct (ideal) computer to remove (i.e., in this example, identify computer 20C to remove (inactivate)).

To implement the protocol 200, each of the computers 20 in the cluster simultaneously operates as an observing computer (meaning the computer observes the other computers in the cluster) and an observed computer (meaning the computer is observed by the other computers in the cluster). Each of the computers 20 also maintains two health scores: an observed health score, which is the health score of each of the other computers, and an observing health score, which is the health score of the observing computer. For example, when observing computers 20B and 20C, computer 20A is an observing computer and computers 20B and 20C are observed computers. Thus, each of the computers 20 in the cluster 10 is both and observed and an observing computer. The computers 20 communicate their observations amongst each other by way of the messages, such as the message 40 from node C to node A.

As noted above, each computer 20 within the cluster 20 includes an instance of the protocol 200. The protocol 200 operates on a generally continuous basis; that is, each computer 20 maintains continuous operation of the protocol 200 while the computer 20 is active in the cluster 20. However, the frequency of actions occurring as a result of protocol execution my be varied. The protocol 200 defines two time intervals: a fatal timeout occurs when one of the computers 20 has not been heard from (i.e., no message received) within a specified time; when a computer 20 has not been heard from during this fatal timeout interval, the observing computer 20 will calculate which computer has not been heard from and will designate this computer for removal from the cluster 10. For ease of explanation, the computer that is actually removed from the cluster 10 is designated as the "loser." The remaining computers are designated as "survivors," and will remain active on the cluster 10. However, as will be explained below, the computer that is removed from the cluster 10 may not be the computer that has not been heard from. Nonetheless, when a fatal timeout occurs, one computer will be removed from the cluster 10, and when any one computer observes a fatal timeout, that computer will force the other computers to observe a fatal timeout soon thereafter. Thus, the protocol 200 guarantees that all surviving computers will have selected the same computer to be removed.

A second time interval, designated as a health timeout, and which may be some fraction, such as one-half, of the fatal timeout, is used by the computers 20 to detect "poor" health of another computer 20. A computer 20 that has not been heard from during this health timeout is said to be exhibiting poor health with respect to the observing computers. As a consequence of this protocol 200, a computer that observes poor health may in fact be a failing computer. Observing poor health in multiple other computers is a strong indication that the observing computer is the failing computer.

At the conclusion of the health timeout, each of the computers 20 performs calculations as to the health state of each other computer, and passes this observed health data to the other computers, as part of the messages. Naturally, a computer that cannot send the health messages will not be able to send these health data to the other computers. Once the health information has been received, each computer 20 analyses the distributed health information to determine which of the computers 20 to remove from the cluster 10. The analysis is carried out independently by each of the computers 20 and yields the same result from the perspective of the survivors. The loser is not required to identify itself, since using quorum rules (see quorum protocol 120, FIG. 2) the survivors will forcefully remove the loser from the cluster 10.

To identify the loser, each computer 20 maintains a health score for each computer 20 in the cluster 10. By way of example, the score may be registered as 1 for a healthy computer and 0 for an unhealthy computer. Upon detection of a fatal timeout (i.e., any one computer has not been heard from for the time interval corresponding to the fatal timeout), each computer 20 in the cluster 10 performs the following calculation with respect to every other active computer 20 in the cluster 10.

For each computer 20 that the calculating computer observes to have poor health, add one (1) to the observed health score and one (1) to the observing health score. The computer 20 with the largest health score is the ideal loser, and will be removed from the cluster 10. However, it is possible that the above health calculation will result in a tied health score. In this event, another mechanism may be added to designate a computer for removal. An example of such a tie-breaking mechanism is to select the computer with the lowest cluster identification number (ID)(in FIG. 1, IDs A-D) for removal.

An example of the application of the protocol to the computer cluster 10 will illustrate application of this selection logic. Assume that computer 20C has lost the ability to receive messages but still can send messages. At the health timeout, computer 20C is observing poor health from the computers 20A and 20B because the computer 20C cannot receive any health status (messages) from the computers 20A and 20B. However, the computers 20A and 20B are not observing any poor health because each of the computers 20A and 20B continue to receive messages from each of the other computers 20 in the cluster 10 (i.e., computer 20A receives messages from computers 20B and 20C; computer 20B receives messages from computers 20A and 20C).

At the health timeout, computer 20A has collected the following health data:
Computer 20A's data: A=1, B=1, C=1;
Computer 20B's data: A=1, B=1, C=1; and
Computer 20C's data: A=0, B=0, C=1.

Computer 20A performs the health calculation adding a one (1) for each computer observed to have poor health, and a one (1) to the observing computer's health score. This calculation results in a health score of zero (0) for computer 20A, a zero (0) for computer 20B, and a two (2) for computer 20C. Computer 20A therefore selects computer 20C as the loser.

Similarly, at the health timeout, computer 20B has collected the following health data:
Computer 20A's data: A=1, B=1, C=1;
Computer 20B's data: A=1, B=1, C=1; and
Computer 20C's data: A=0, B=0, C=1.

Computer 20B performs the health calculation adding a one (1) for each computer observed to have poor health, and a one (1) to the observing computer's health score. This calculation results in a health score of zero (0) for computer 20A, a zero (0) for computer 20B, and a two (2) for computer 20C. Computer 20B therefore selects computer 20C as the loser.

Health calculations by computer 20C are not required; the selection by computers 20A and 20B of computer 20C as the loser results in the eviction of computer 20C from the cluster 10 based on quorum membership rules.

The above example of an application of the protocol 200 to a computer cluster experiencing a failure illustrates a general process for identifying the ideal computer to remove from the cluster 10. However, certain other failures of components of the cluster 10 may require additional or alternate processing and evaluation steps. Consider, for example, the cluster 10 of FIG. 1 with all four computers 20A-20D active. Computers 20A and 20B may be arranged at a first site, or sub-cluster, 21 physically separated from the computers 20C and 20D at a second site, or sub-cluster 22. During normal operations, both sub-clusters 21, 22 are active because of the established communications between the sub-clusters. In the event that communications between the two sub-clusters 21 and 22 is severed, all required health messages cannot be received in the normal course of events. However, the computers 20A and 20B cannot distinguish this loss of communications between the sub-clusters 21 and 22 from a catastrophic failure of the sub-cluster 22. Were the protocol 200 of FIG. 2 to be used in this specific situation, all four computers 20A-20D would receive the same health score calculation, namely two (2). With this score, local computer 20A could choose local computer 20B as the ideal loser. Then, computer 20A would try to form a sub-cluster with the computers 20C and 20D. But formation of such a cluster is not possible, and the result will be a total failure of the cluster 10. To avoid this situation, the protocol 200 includes an option to be biased in favor of the observing computer. That is, knowing that some computer is observed to have failed is slightly more predictive of an ideal loser than knowing that some computer is observing another computer to have failed. This slight biasing is chosen when an event occurs in the cluster 10 wherein the remaining sub-cluster has exactly half the number of computers 20 as did the original cluster 10 before the failure.

Thus, to avoid selecting a loser from the local sub-cluster, the health protocol 200 is modified so that in the event the number of computers 20 in a sub-cluster is exactly half those in the original cluster, upon detection of a fatal timeout by any computer 20A-20D, the health calculation is carried out with respect to each other computer 20 as follows:

For each computer 20 that the calculating computer is observing to have poor health, a value of 1.1 (rather than 1, as before) is added to the observed health score;

Select the computer with the highest health score as the ideal loser; and

In the event of ties, select the computer with the lowest cluster ID.

Assume that the cluster 10 suffers a severance of communications between the two sub-clusters 21 and 22. Prior to the severance, each of the computers 20A-20D received health data from each of the other computers, with no indications of poor health. After the severance, each of the computers 20 observes poor health at the health timeout, followed by a fatal timeout.

Computer 20A has the following observed health data:
Computer 20A's data: A=1, B=1, C=0, D=0;
Computer 20B's data: A=1, B=1, C=0, D=0;
Computer 20C's data: A=1, B=1, C=1, D=1; and
Computer 20D's data: A=1, B=1, C=1, D=1.

Computer 20A performs the health calculation adding a 1.1 for each computer observed to have poor health, and a one (1) to the observing computer's health score. This calculation results in a health score of two (2) for computers 20A and 20B. The calculation results in a health score of 2.2 for computer 20C (computers 20A and 20B have observed computer 20C to have failed) and a health score of 2.2 for computer 20D (computers 20A and 20B have observed computer 20D to have failed. Computer 20A sees a tie between computers 20C and 20D and selects computer 20C (lowest cluster ID) for removal.

Computer 20B has the following observed health data:
Computer 20A's data: A=1, B=1, C=0, D=0;
Computer 20B's data: A=1, B=1, C=0, D=0;
Computer 20C's data: A=1, B=1, C=1, D=1; and
Computer 20D's data: A=1, B=1, C=1, D=1.

Computer 20B performs the health calculation adding a 1.1 for each computer observed to have poor health, and a one (1) to the observing computer's health score. This calculation results in a health score of two (2) for computers 20A and 20B. The calculation results in a health score of 2.2 for computer 20C (computers 20A and 20B have observed computer 20C to have failed) and a health score of 2.2 for computer 20D (computers 20A and 20B have observed computer 20D to have failed. Computer 20B sees a tie between computers 20C and 20D and selects computer 20C for removal.

The result is that computers 20A, 20B and 20D survive, initially, and computer 20C is removed. However, since computer 20D is fully disconnected from sub-cluster 21, computer 20D, from the perspective of computers 20A and 20B, should removed under the quorum rules. That is, because the computers 20A and 20B cannot receive health data from the computer 20D (cannot see computer 20D), the quorum rules will operate to remove computer 20D.

A similar set of calculations is performed from the perspective of computers 20C and 20D resulting in computers 20B-20D as the initially surviving computers, until computer 20B is finally removed because two (computers 20C and 20D) out of the three surviving computers cannot see computer 20B.

At this stage in the process, since only one cluster is allowed to remain in existence, the computers 20A, 20B as one sub-cluster (21), and the computers 20C, 20D as the other sub-cluster (22) compete for a tie-breaking vote to become the surviving cluster. To determine which of the sub-clusters 21, 22 survives, a tie breaking process may be invoked. The tie-breaking process may be established in advance by a user of the cluster 10'. In one embodiment, the user may establish a rule, using separate processor 50, or another computing or memory device, that is used as the tie-breaking mechanism. The tie-breaking mechanism 50 supplies the tie-breaking vote, and because only one of these two sub-clusters obtains the tie-breaking vote, it becomes the surviving cluster.

Figure 3:
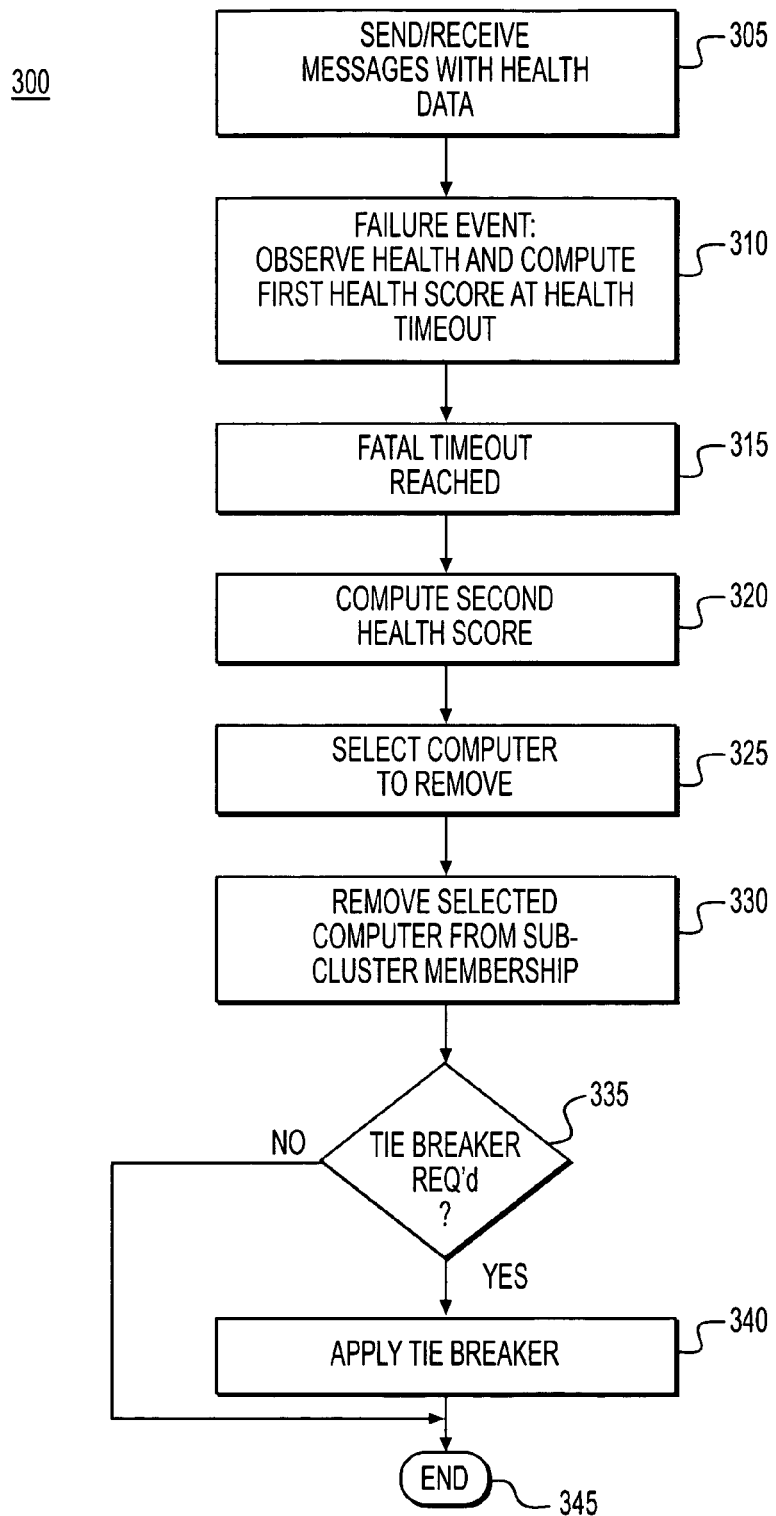
FIG. 3 is a flowchart illustrating an exemplary operation of the protocols of FIG. 2 to select an ideal computer to remove from a highly available cluster observing failure.

FIG. 3 is a flowchart illustrating an exemplary process 300 of the health and the membership selection protocols. The process 300 begins in block 305 with each of computers 20A-20D sending and receiving messages, such as the message 40 from node C to node A, with the messages including health information relative to the computers 20A-20D. For example, a message sent from the computer 20D to the computer 20A could report that the computer 20D had (or had not) received health reports from the computers 20A-20C.

Following the message receipt, communications between the two sub-clusters 21 and 22 are severed. In block 310, computer 20A observes, at the health timeout, the computers 20C and 20D to have poor health, and the computer 20B to have good health. Similarly, the computer 20C observes the computer 20D to have good health and the computers 20A and 20B to have poor health, and so on. In block 315, the fatal timeout is reached, and in block 320 each computer 20 calculates a health score by adding a value of 1.1 to the health score of each computer observed to have poor health and records this health score. For example, computer 20A determines the health score of computer 20B to be 2.0 and the health scores of computers 20C and 20D to be 2.2. The other computes perform similar calculations. In block 325, each of the computers 20A and 20B select computer 20C as the ideal loser. In block 330, the quorum module 120 removes computer 20D from any membership with computers 20A and 20B, since the computers 20A and 20B are disconnected from the computer 20D. Similar calculations and selections are performed by the computers 20C and 20D with the result that two sub-clusters exist, but are unable to communicate. In block 335, each of the sub-clusters submits a query to processor 50 to determine if a tie-breaking routine is required. Since two sub-clusters actually survive, a tie breaker is required, and the processor determines which of the two sub-clusters (and their associated computers 20) will remain active. In block 340, the processor determines which sub-cluster will survive, and the computers in the remaining sub-cluster are deactivated. The operation 300 then ends, block 345.

We claim:

1. An apparatus for selecting a computer to remove from a computer cluster, wherein the computer cluster comprises a plurality of computers, the apparatus comprising:
    a memory storing,
        a quorum protocol module that selects a computer to remove from the cluster based on a defined set of quorum rules; and
        a health module for monitoring health data of each of the plurality of computers, the health module comprising:
            a messaging module that forms, transmits, and receives health messages containing health data,
            a fatal timeout module that provides a fatal timeout corresponding to a first time period within which health data is not received from any one computer in the cluster,
            a health timeout module that provides a health timeout calculated as a fraction of the fatal timeout, wherein on occurrence of the health timeout, upon not receiving health data from any other computer, a first health score is recorded as a poor health score for the other computer and, upon receiving health data from any other computer, the first health score is recorded as a good health score for the other computer,
            a health processing module that calculates a second health score, based on the first health score, for each of the plurality of computers upon the occurrence of the fatal timeout, and
            a selection module that selects a computer for removal from the cluster based on calculated second health scores; and
    a processor to implement the quorum protocol module and health module in the memory.

2. The apparatus of claim 1, the memory further comprising a tie-breaker module that applies a tie-breaking rule in the event of two or more computers having a tied second health score.

3. The apparatus of claim 2, wherein the tie-breaking rule selects a computer having a lowest cluster identification number.

4. The apparatus of claim 2, wherein the tie-breaking rule is supplied by a third party processor coupled to the cluster.

5. The apparatus of claim 1, wherein the first health score is computed as:
    for each computer exhibiting poor health, record a value of 0 at the health timeout; and
    for each computer not exhibiting poor health, record a value of 1 at the health timeout.

6. The apparatus of claim 1, wherein the second health score is computed as:
    add a value of 1 to the first health score of the computer exhibiting poor health; and
    add a value of 1 to the first health score of the computer observing poor health by another computer.

7. The apparatus of claim 1, wherein the cluster of computers is formed by two sub-clusters.

8. The apparatus of claim 1, wherein the second health score is computed as:
    add a value of 1.1 to the first health score of the computer exhibiting poor health; and
    add a value of 1.1 to the first health score of the computer observing poor health by another computer.

9. The apparatus of claim 1, wherein the selection module selects a computer having the highest second health score for removal from the cluster.

10. A method, implemented by a processor, for removing a computer from a computer cluster, the computer cluster comprising a plurality of computers, the method comprising:
    recording, health data for each of the plurality of computers;
    computing, at a health timeout, a first health score for each of the plurality of computers based on the health data;
    computing, at a fatal timeout, and based on the first health score, a second health score for each of the plurality of computers; and
    selecting, by the processor, a computer having the highest second health score for removal from the cluster.

11. The method of claim 10, wherein the health timeout is a fraction of the fatal timeout.

12. The method of claim 10, wherein multiple computers are selected for removal from the cluster, further comprising invoking a tie breaking step to designate one computer for removal from the cluster.

13. The method of claim 12, wherein the tie breaking step comprises using a cluster identification to designate the one computer for removal.

14. The method of claim 12, wherein the tie breaking step comprises using a third-party processor to designate the one computer for removal.

15. The method of claim 10, wherein computing the first health score comprises:
    assigning a value of 1 to each computer exhibiting good health; and
    assigning a score of 0 to each computer exhibiting poor health.

16. The method of claim 15, wherein computing the second health score comprises:
    assigning a value of 1.1 to the first health score of the computer exhibiting poor health; and assigning a value of 1.1 to the first health score of the computer observing poor health by another computer.

17. The method of claim 10, further comprising:
determining that a quorum of the plurality of computers has selected a specific computer for removal; and
removing, using quorum rules, the computer selected by the quorum of the plurality of computers.

18. A non-transitory computer readable medium on which is embedded a computer program, said computer program implementing a method for selecting a computer to remove from a cluster of a plurality of computers, said computer program comprising computer readable code to:
record health data for each of the plurality of computers;
compute, at a health timeout, a first health score for each of the plurality of computers based on the health data;
compute, at a fatal timeout, and based on the first health score, a second health score for each of the plurality of computers; and
select a computer having the highest health score for removal from the cluster.

19. The non-transitory computer readable medium of claim 18, wherein multiple computers are selected for removal from the cluster, further comprising invoke a tie breaking function to designate one computer for removal from the cluster.

20. The non-transitory computer readable medium of claim 18, further comprising determine that a quorum of the plurality of computers has selected a specific computer for removal.

* * * * *

UNITED STATES PATENT AND TRADEMARK OFFICE
CERTIFICATE OF CORRECTION

PATENT NO. : 8,108,712 B1
APPLICATION NO. : 12/588857
DATED : January 31, 2012
INVENTOR(S) : Charles J. Carlino et al.

It is certified that error appears in the above-identified patent and that said Letters Patent is hereby corrected as shown below:

In column 8, line 37, in Claim 10, delete "recording," and insert -- recording --, therefor.

Signed and Sealed this
Twelfth Day of February, 2013

Teresa Stanek Rea
*Acting Director of the United States Patent and Trademark Office*